United States Patent [19]

Moore et al.

[11] Patent Number: 4,961,310

[45] Date of Patent: Oct. 9, 1990

[54] SINGLE SHAFT COMBINED CYCLE TURBINE

[75] Inventors: James H. Moore; Klaus M. Retzlaff, both of Schenectady; Kenneth E. Robbins, Saratoga, all of N.Y.

[73] Assignee: General Electric Company, Schenectady, N.Y.

[21] Appl. No.: 374,812

[22] Filed: Jul. 3, 1989

[51] Int. Cl.⁵ .............................................. F02C 7/20
[52] U.S. Cl. ............................... 60/39.182; 60/39.31; 415/213.1
[58] Field of Search ............... 60/39.182, 39.31, 39.32; 415/134, 213.1, 220; 248/605, 606, 639, 901

[56] References Cited

U.S. PATENT DOCUMENTS

| | | | |
|---|---|---|---|
| 2,443,054 | 6/1948 | Putz et al. | 60/39.31 |
| 2,929,218 | 3/1960 | Yates | 415/213.1 |
| 3,098,190 | 7/1963 | Spencer et al. | |
| 3,198,954 | 8/1965 | Eggenberger et al. | |
| 3,556,672 | 11/1971 | Gentile | 60/39.32 |
| 3,658,438 | 4/1972 | Coleman et al. | 415/213.1 |
| 4,519,207 | 5/1985 | Okabe et al. | |
| 4,744,726 | 5/1988 | Remberg | 415/213.1 |

FOREIGN PATENT DOCUMENTS 62-38525  8/1987  Japan .

Primary Examiner—Louis J. Casaregola
Attorney, Agent, or Firm—Nixon & Vanderhye

[57] ABSTRACT

An improved combined cycle plant with a gas turbine, a steam turbine and a generator arranged in tandem on a single shaft system in the order aforementioned, including a single thrust bearing with rigidly coupled rotor members. A thrust bearing for the shaft system is supported in a bearing standard keyed to the foundation on the side of the steam turbine toward the gas turbine to restrain axial movement. The thrust bearing is preferably located in the compressor inlet of the gas turbine. The steam turbine comprises a first casing with the hihg pressure section supported in a bearing standard keyed to the foundation adjacent the thrust bearing. The second casing with the low pressure section is keyed to the foundation at its outlet in the center of the exhaust hood. In a preferred arrangement with a single flow low pressure turbine section, the second casing combines an intermediate pressure turbine section adjacent the generator receiving steam from the reheater. In a modified arrangement with a double flow low pressure section, the intermediate pressure turbine section turbine section is combined with the high pressure turbine section in the first casing.

9 Claims, 5 Drawing Sheets

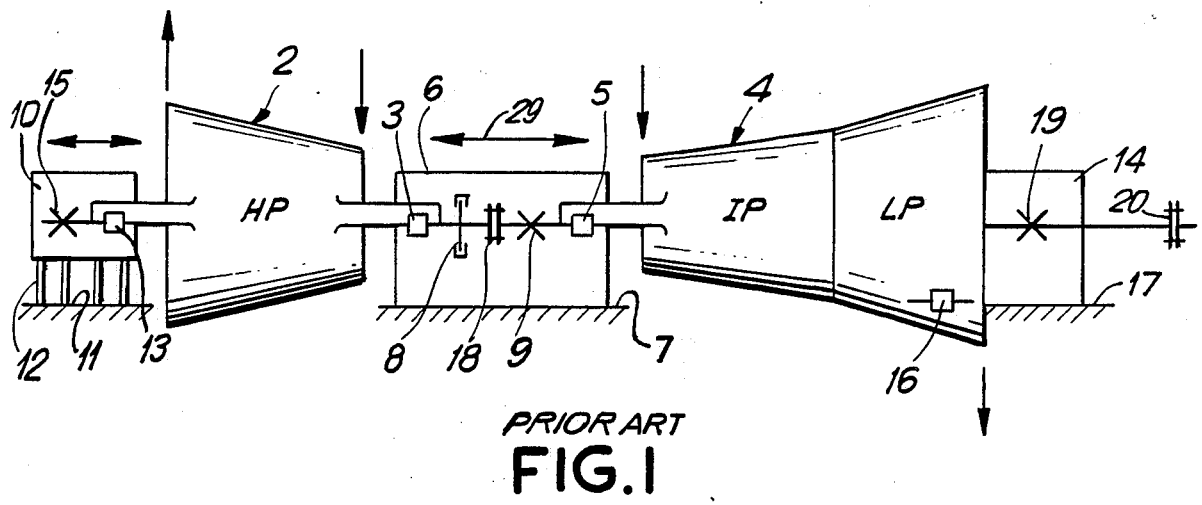
FIG.1 PRIOR ART
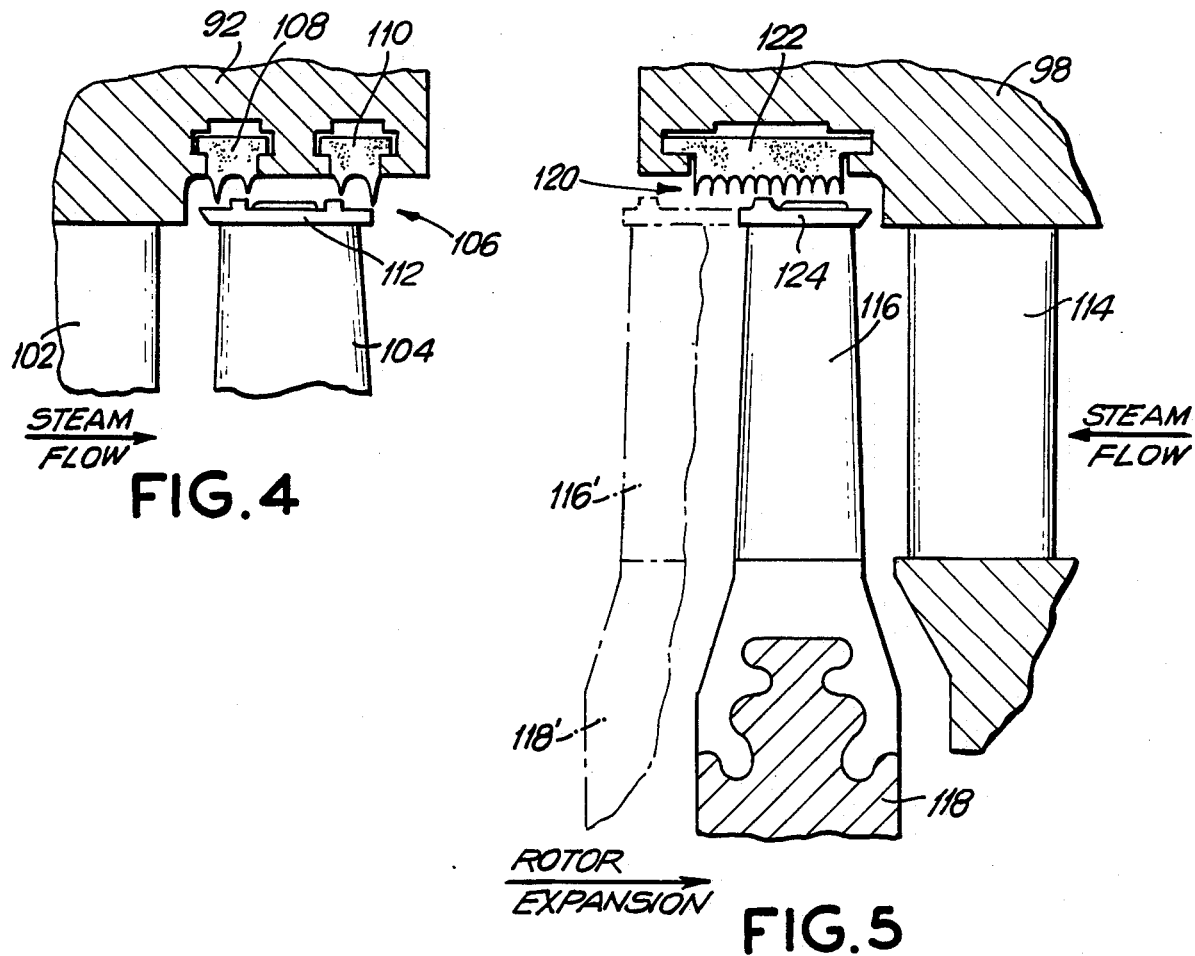
FIG.4
FIG.5

SINGLE SHAFT COMBINED CYCLE TURBINE

BACKGROUND OF THE INVENTION

This invention relates generally to large combined cycle power systems having a steam turbine and gas turbine, together driving an electrical generator as the load, and more particularly to improvements in a tandem arrangement of gas turbine, steam turbine and generator on a single shaft system of rigidly coupled rotor members and having a single thrust bearing for the rotor system.

Many arrangements for gas turbines and steam turbines in a combined cycle have been proposed. A combined cycle is an integrated thermal cycle, wherein the hot exhaust gas from a combustion gas turbine contributes heat energy to partially or wholly generate the steam used in the steam turbine. Combined cycle power plants have been built with the gas turbine, steam turbine and generator rotors connected in tandem by flexible or by solidly bolted rigid couplings. If the rotor members in the single shaft system are rigidly coupled, only one thrust bearing can be employed, since the shaft system expands or grows in an axial direction due to thermal expansion from the thrust bearing.

A proposal for a single shaft combined cycle having gas turbine, single-flow non-reheat steam turbine and generator connected in tandem in the order aforesaid on a single shaft system with rigidly coupled rotor members and a single thrust bearing is disclosed in Japanese patent publication No. 62-38525, published May 6, 1983. In this publication, the single thrust bearing is located between the gas turbine and the steam turbine. The single-flow steam turbine section is arranged in flow opposition to the gas turbine in order to create thrust in opposition to that of the gas turbine, and thereby reduce the size of the thrust bearing. However, no provisions are shown for support of the members on the foundation or to provide for thermal expansion.

Gas turbines have now been developed that have substantially higher power ratings and higher exhaust temperatures than previously available. Because of this, higher rated steam turbines are required and a reheat steam cycle is economically attractive for combined cycle applications. A conventional reheat steam turbine requires at least two casings which are normally arranged to reduce the unbalanced thrust. A typical arrangement for a two-casing reheat turbine having a single flowed low pressure section has three bearing standards, the center bearing standard supporting one end of each of the casings and also containing a thrust bearing. The two casings are keyed to the foundation at only one point, preferably the center of the exhaust hood connection in the low pressure section. The center bearing standard with the thrust bearing is arranged to move relative to the foundation. The two casings supported by the center bearing standard are also keyed to it so that the casings move together with the bearing standard, while the shaft and both casings grow thermally in opposite directions from one another relative to the center bearing standard. While this is an ideal arrangement for a reheat steam turbine, it is not possible to simply substitute a conventional two casing reheat steam turbine design into a single shaft combined cycle of the type described above, since a two casing reheat steam turbine has a moving thrust bearing between the casings. Keying of the thrust bearing to the foundation on either outside end of the two casings or keying the center thrust bearing standard to the foundation between the casings is not normally considered because this would create large differential thermal expansion between rotating and non-rotating members and result in unacceptable efficiency losses.

Accordingly, one object of the present invention is to provide an improved combined cycle plant having a gas turbine, as steam turbine and a generator arranged in tandem in the order aforesaid on a single shaft system with a single thrust bearing, while attaining the high efficiency of a conventional steam turbine design.

A further object of the invention is to provide an improved reheat steam turbine foundation support and anchor point arrangement which is especially adapted for such a single shaft combined cycle plant.

SUMMARY OF THE INVENTION

Briefly stated, the invention comprises an improved combined cycle plant having a gas turbine, a steam turbine and a generator arranged in tandem on a single shaft system including a single thrust bearing with rigidly coupled rotor members, wherein the improvement comprises a thrust bearing for the shaft system supported on first means keyed to the foundation on the side of the steam turbine toward the gas turbine to restrain axial movement of the shaft system, and wherein the steam turbine comprises a two-casing reheat steam turbine having a high pressure turbine section, an intermediate pressure turbine section receiving steam which has been reheated by the gas turbine exhaust, and a low pressure turbine section discharging into an exhaust hood. The first casing is supported at one end on second means keyed to the foundation adjacent the thrust bearing, while the other end is allowed to move. The second casing is supported at least in part within the exhaust hood on third means keyed to the foundation at the center of the exhaust hood. In a preferred form of the invention the intermediate pressure section is disposed in the second casing and supported on a standard near the generator to allow axial movement thereof. A modified form of the invention combines high pressure and intermediate pressure turbine sections in the first casing and uses double-flow low pressure sections completely within the exhaust hood as the second casing.

The disclosed arrangements of the casings provide for opposed flow in the turbine sections to minimize thrust load, minimize differential expansion between stationary and moving blades and achieve smallest clearances between nozzles and buckets in the hot operating condition for best efficiency. Further improvements include employment of stepped high-low packings for efficiency and single diameter packings permitting substantial relative movement at the appropriate places in both embodiments.

DRAWING

The subject matter which is regarded as the invention is particularly pointed out and distinctly claimed in the concluding portions of the specification. The invention, however, both as to organization and method of practice, together with further objects and advantages thereof, may best be understood by reference to the following description, taken in connection with the accompanying drawing in which:

FIG. 1 is a simplified schematic drawing of a prior art reheat steam turbine with a single flow low pressure section;

FIG. 4 is a fragmentary side elevational view of a portion of a typical steam turbine stage in the high pressure turbine section;

FIG. 5 is a fragmentary side elevational view, partly in section, of a typical turbine stage in the lower pressure turbine section;

Figure 6:
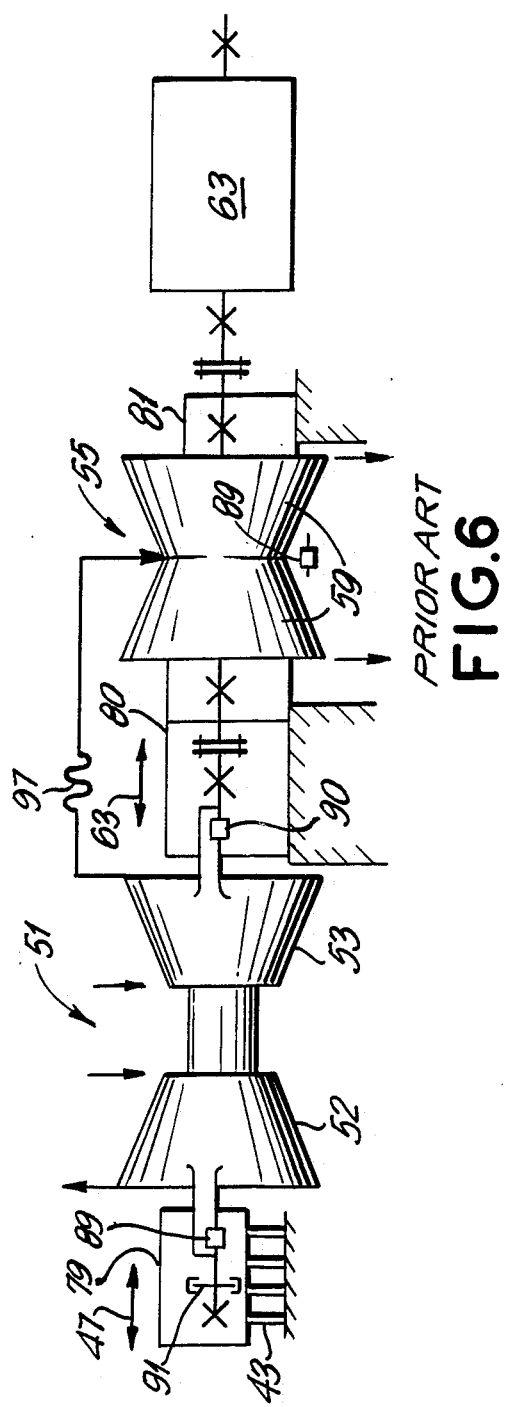
Figure 9:
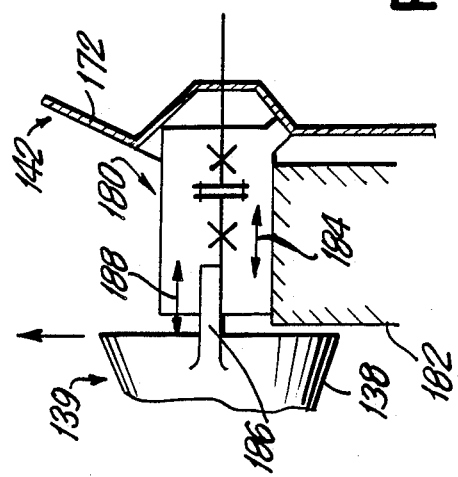
Figure 7:
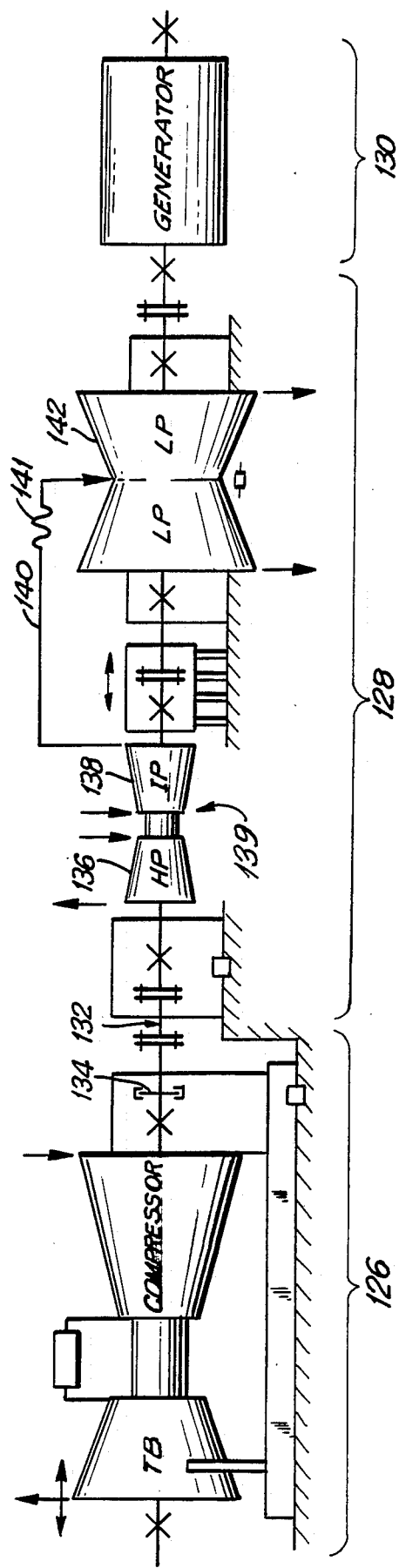
Figure 8:
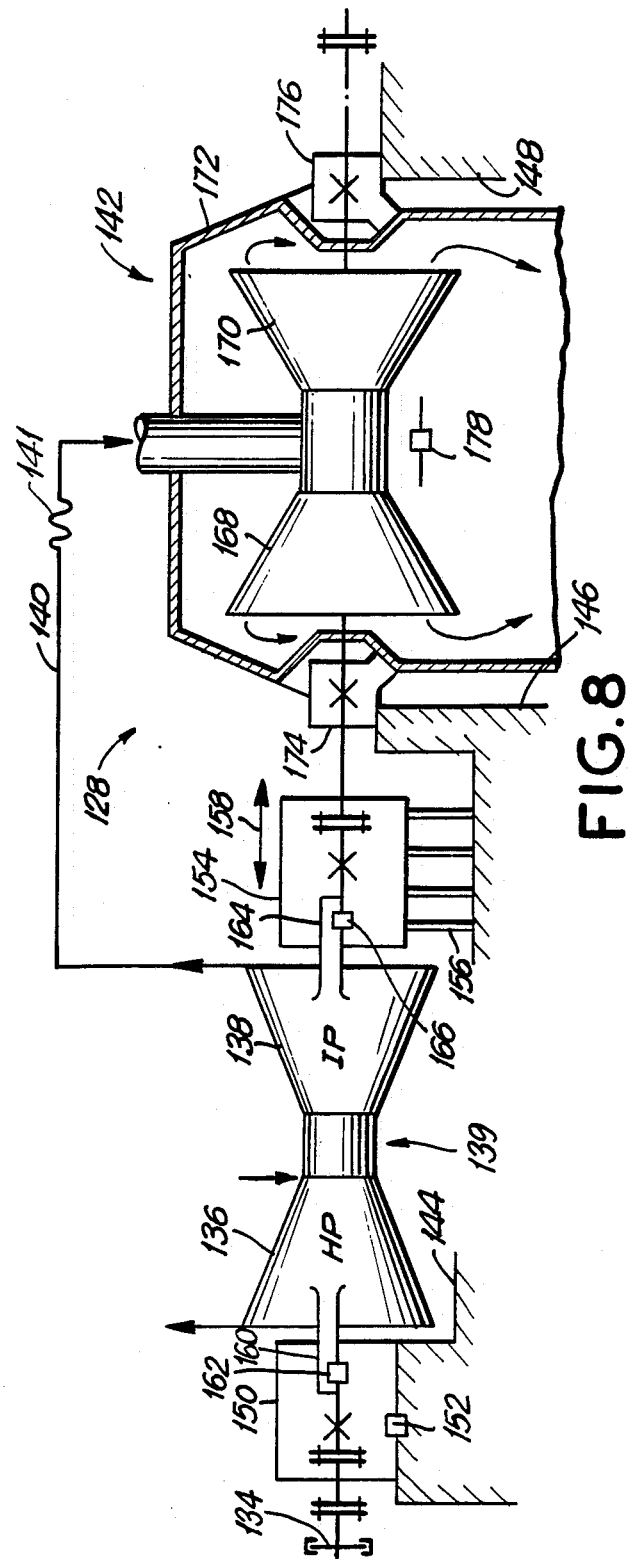

FIG. 6 is a simplified schematic drawing of a prior art reheat steam turbine with a double flow low pressure section, FIG. 7 is a simplified schematic drawing of a combined cycle according to a modified form of the invention, FIG. 8 is a more detailed schematic side elevational drawing of the reheat steam turbine shown in the FIG. 7 modification, and FIG. 9 is a partial schematic side elevational view illustrating an alternate bearing standard for the FIG. 8 modification.

DESCRIPTION OF PREFERRED EMBODIMENT

Referring now to FIG. 1 of the drawing, a prior art reheat steam turbine is shown which includes a single-flow high pressure turbine section in a first casing 2 and a single-flow turbine in a second casing 4 receiving reheat steam. The turbine casing 4 comprises an intermediate pressure turbine section, and a low pressure turbine section emptying into an exhaust hood. The casings 2, 4 are disposed on either side of and supported at their inlet ends by pairs of supporting arms keyed at 3 and 5 respectively to a central bearing standard 6. Central standard 6 also incorporates a central thrust bearing 8 and a journal bearing 9. Bearing standard 6 may move axially by sliding on a foundation baseplate 7 as indicated by the arrow 29. Turbine sections in casings 2, 4 are arranged in opposed flow relationship in order to minimize thrust carried by the thrust bearing 8. A front bearing standard 10 is supported by the foundation 11 on flexible legs 12 and supports a high pressure shaft journal bearing 15 and the high pressure casing outlet end on pairs of support arms which are keyed to the standard 10 at reference number 13. A rear bearing standard 14 supports the low pressure casing and rotor journal bearing 19. Beyond the bearing standard 14, the rotor is connected by coupling 20 to a generator (not shown). The low pressure exhaust hood is keyed at 16 to the foundation 17, near the center of its outlet where the exhaust hood connects to a condenser through an expansion joint. Preventing movement at this point avoids imposing shear loading on the expansion joint. Since both casings are keyed to the slidable central standard 6, the casings both grow thermally to the left from keyed point 16. The two rotor members for the respective turbine sections are rigidly coupled together by a coupling 18, and expand thermally in both directions from thrust bearing 8. Therefore, relative to the central bearing standard 6, the inlet ends of both casings are least subject to differential expansion between rotating and stationary components.

While the prior art arrangement of FIG. 1 is suitable for a reheat steam turbine power plant in a multi-shaft combined cycle, it is not suitable for a single shaft, combined cycle plant with a gas turbine on a single shaft system having a single thrust bearing, since the thrust bearing 8 and the central standard 6 move axially and this would cause unacceptable axial movement of the gas turbine rotor in its casing.

Figure 2:
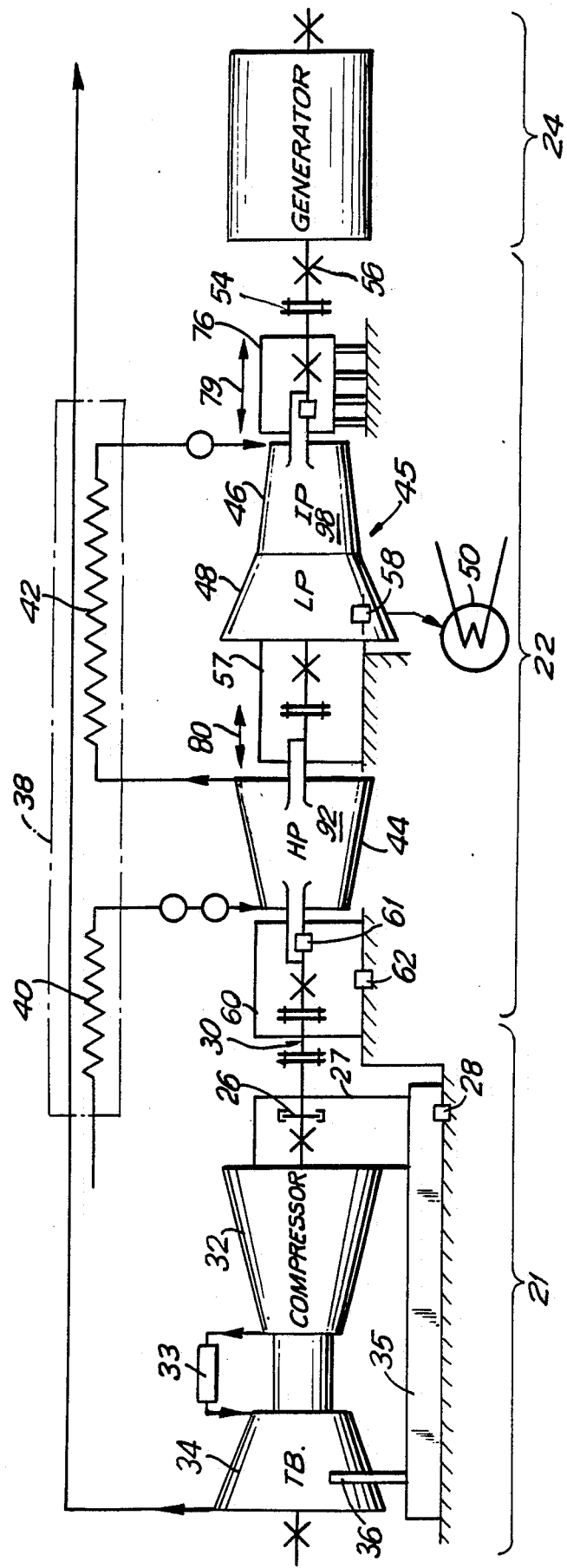
FIG. 2 is a simplified schematic drawing of a combined cycle power plant in accordance with the present invention.

Reference to FIG. 2 of the drawing illustrates a simplified schematic drawing of a single shaft combined cycle plant utilizing an improved reheat steam turbine single flow arrangement in accordance with a preferred embodiment of the present invention. There, a gas turbine shown generally at 21 and a steam turbine shown generally at 22, are arranged in tandem with a generator 24 in the order aforementioned on a rigidly coupled single shaft system having a single thrust bearing 26. Thrust bearing 26 is supported in a bearing standard 27 in the gas turbine compressor inlet comprising first means supporting the thrust bearing 26 and keyed to the foundation at 28 directly below thrust bearing 26 to restrain axial movement of the single shaft system at this point. The single shaft system is shown generally as 30, and runs through the gas turbine 21, steam turbine 22 and generator 24, comprising rigidly coupled rotor members.

The gas turbine 21 includes a compressor 32, fuel combustor 33 and turbine 34 on a bed plate 35. The turbine exhaust end is supported on the bedplate 35 on flexible legs 36 permitting axial movement of compressor and turbine from front standard 27, while the shaft expands toward the left, when heated, from thrust bearing 26.

Turbine 34 exhausts hot gas through a heat recovery steam generator 38. The heat recovery steam generator 38 may be either fired or unfired and may generate steam at several pressure levels, but is shown in its simplest form as including at least a primary high pressure steam generator 40 and a steam reheater 42. The steam turbine 22 includes a high pressure turbine section 44 in a first casing 92 connected to receive steam through valves from the primary steam generator 40 at its inlet end, exhausting steam to reheater 42. A turbine shown generally at 45 which consists of a combined intermediate pressure turbine section 46 and single flow low pressure turbine section 48 combined in a single second casing 98 is connected to receive steam at its inlet end from reheater 42 and to exhaust it through an exhaust hood 49 (see FIG. 3) to condenser 50.

The single shaft system shown generally at 30 consists of a number of rotor members rigidly connected together by rigid couplings such as 54 and supported in journal bearings such as 56. The casing 98 of turbine 45 is supported at one end in the exhaust hood 49 which, in turn, is supported partially by bearing standard 57 and keyed to the foundation at 58. The exhaust hood also rests on the foundation at several locations which are not seen in the plane of the drawing. Axial movement of the casing 98 inlet end is permitted by flexible legs on bearing standard 76, as shown by arrows 79.

The high pressure turbine section 92 has the inlet of its casing 92 supported on a front bearing standard 60 on arms keyed to the standard at 61. The outlet end of the casing 92 may slide on arms supported on standard 57 as shown by arrows 80. Standard 60 is keyed to the foundation at 62 to restrain it against axial movement.

Figure 3:
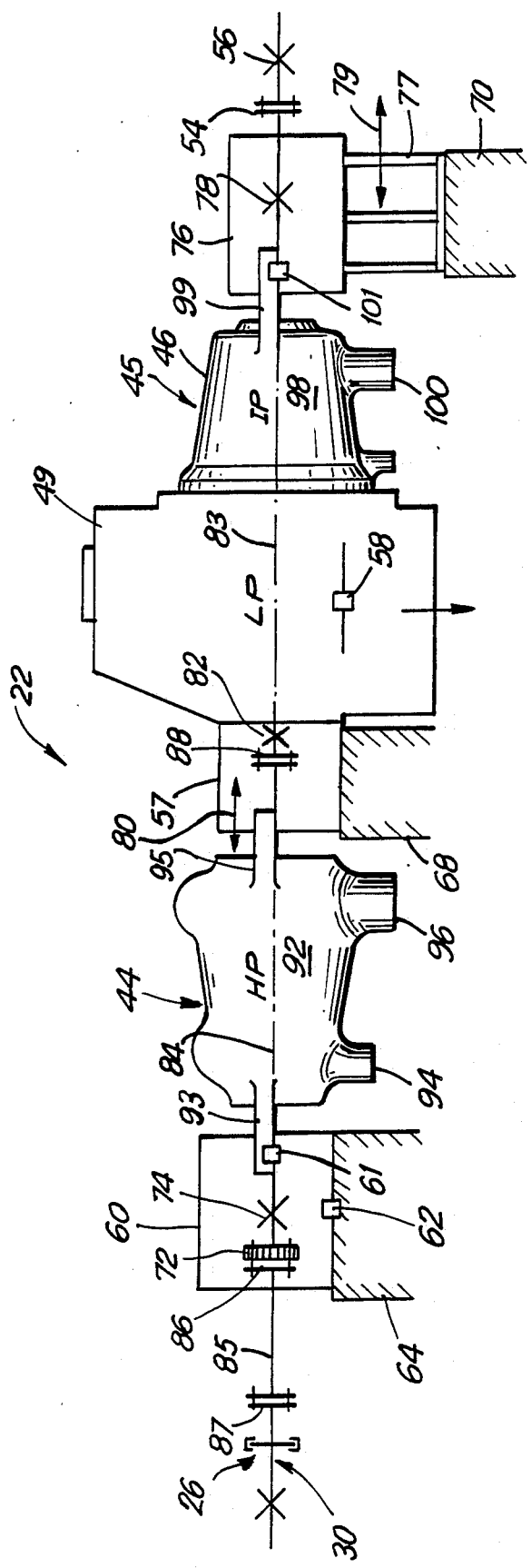
FIG. 3 is a more detailed schematic side elevational view of the improved reheat steam turbine arrangement according to the present invention.

Referring now to FIG. 3 of the drawing, a more detailed schematic view of the improved reheat steam turbine arrangement is shown, with the single shaft system 30 shown as a single line. The two-casing reheat steam turbine 22 is supported on a foundation, portions of which are indicated at 64, 68, 70. The front bearing standard 60 is supported on the foundation 64 and keyed to it at 62 on the side of the steam turbine toward the thrust bearing 26 to restrain against axial movement. Standard 60 also supports a turning gear 72 and a journal bearing 74.

The rear bearing standard 76 at the opposite end of the steam turbine on the side toward the generator is supported on foundation member 70 on flexible legs 77 as shown, or alternatively on a sliding standard, permitting axial movement (arrows 79) and includes a journal bearing 78. The central standard 57 is supported on foundation member 68 between turbines 44 and 45 and includes a journal bearing 82. As previously mentioned, turbine 45 combines an intermediate pressure turbine section 46 and a low pressure turbine section 48 in a second casing 98, supported at one end in exhaust hood 49 which is also considered part of the second casing. The outlet from the exhaust hood 49 is keyed at 58 to the foundation at the connection to a condenser expansion joint (not shown), and also partially supported on the foundation.

Portions of the single shaft system 30 which are shown in FIG. 3 are a high pressure steam turbine rotor member 84 and a low pressure turbine rotor member 83 rigidly coupled together at 88. These two rotor members are supported in three journal bearings 74, 82, 78. Rotor member 84 is rigidly coupled to the gas turbine through a spacer or spool piece 85 by rigid couplings 86, 87. Rotor member 83 is rigidly coupled to the generator by rigid coupling 54.

The turbine 44, includes a first casing 92 supported at one end by a pair of arms 93 keyed to standard 60 at 61 with an inlet end 94 nearest the thrust bearing 26. Since the standard 60 is keyed to the foundation at 62, it serves as second means supporting the first casing keyed to the foundation adjacent the thrust bearing. Casing 92 is supported at its other end on an opposite pair of arms 95 slidable on standard 57 at the casing outlet end 96 (arrows 80).

The second casing 98 is separately keyed to the foundation at 58. Standard 57 is rigidly connected to low pressure turbine section 48, and is slidable on foundation 68. The exhaust hood 49 is supported by standard 57 and by the foundation itself. Exhaust hood 49 and standard 57 together comprise third means supporting the second casing keyed to the foundation near the center of the exhaust hood outlet.

Casing 98 is supported on a pair of arms 99 at its inlet end 100 keyed to the rear bearing standard 76 at 101. Flexible legs 77 permit deflection of the standard 76 axially as shown by arrows 79. Alternatively, the rear standard 76 could slide on the foundation.

Referring to FIGS. 4 and 5 of the drawing, typical single turbine stages are shown from the high pressure turbine 44 in the first casing and the intermediate pressure turbine 45 in the second casing, respectively. FIGS. 4 and 5 are oriented in the same relative relationship as the turbine sections 44, 46 in FIG. 3 with respect to the directions of steam flow and the direction of rotor expansion.

FIG. 4 illustrates portions of the high pressure casing 92 and a stationary radial nozzle 102 in the steam turbine diaphragm exhausting high pressure, low specific volume steam to a rotating turbine bucket 104 disposed on the rotor member 84 (FIG. 3). A high-low labyrinth steam packing shown generally at 106 consists of two stages of toothed steam packings 108, 110 forming close clearances with a bucket tip shroud 112 connecting the tips of steam turbine buckets 104. Each of the packings includes a stepped diameter or interlocking packing which is highly effective in restricting steam flow, but which accommodates only limited relative axial movement between rotating and non-rotating members.

Reference to FIG. 5 illustrates a turbine stage from the intermediate pressure section in the hot steady state operating condition. Shown is a portion of casing 98 supporting a number of radial nozzle vanes 114 exhausting steam into turbine buckets 116 which are radially disposed on a rotating turbine wheel 118. A labyrinth steam packing 120 is provided by a single diameter multi-tooth packing member 122 forming close clearances with a circumferential shroud 124 connecting the tips of turbine buckets 116. Packing 120 is a single diameter packing which has non-interlocking teeth and hence can accommodate substantial relative movement between the rotating and non-rotating members. Shown in phantom lines in FIG. 5 is the turbine wheel 118' and turbine bucket 116' in the cold condition.

Similar packings to the high-low or interlocking labyrinth packings of FIG. 4 are utilized between the shaft and the bore or inner diameter of the diaphragms of the high pressure section shown in FIG. 4. Similarly, single diameter, non-interlocking packings having straight or slanted teeth permitting substantial relative expansion similar to those shown in FIG. 5 are used between the diaphragm bore and the rotor shaft of the lower pressure turbine section. These packings are not shown but are similar to those shown in FIGS. 4 and 5.

It remains to note that the two steam turbine casing members shown in FIG. 3 are supported from the standards to permit independent axial expansion of the casings from their foundation anchor points in the following manner. The two steam turbine casings are each affixed to the foundation fixed standard 60 at one end and expand thermally independently of each other. The first or high pressure casing 92 is rigidly keyed to the fixed standard at 61 on a pair of support arms 93 on its inlet end, so that the casing and rotor both expand to the right in the same direction away from the thrust bearing 26. This is accommodated by sliding of an opposite pair of casing support arms 95.

The inlet end 100 of the intermediate pressure casing 98 is supported on a pair of support arms 99 keyed to the standard 76 as indicated at 101. While the outlet end of casing 98 is supported and axially restrained by the exhaust hood at key 58, standard 76 may deflect to the right on flexible legs 77. The inlet end of the casing 98 grows in the same direction as the rotor expansion as temperature increases. However, the total movement of the rotor blades is greater than that of the casing in the intermediate pressure turbine section, because the shaft system expands from the thrust bearing 26 which is farther away than the point 58 where the exhaust hood is keyed to the foundation. Therefore, a large differential thermal expansion between rotating and non-rotating members takes place at the inlet end of the lower pressure turbine section. This large relative movement is illustrated in FIG. 5, wherein it is seen that the rotor wheel 118 and turbine buckets 116 move closer to the nozzles 114 as the rotor expands to the hot steady-state condition. This movement is permitted by use of single diameter or non-interlocking multi-tooth packings.

Although the preferred location for the single thrust bearing 26 is in the gas turbine compressor inlet standard, it can also be located in the front bearing standard 60. In either case, the thrust bearing is on the side of the steam turbine toward the gas turbine. The preferred arrangement has the inlet end of the high pressure casing of the reheat steam turbine where steam density is the greatest, keyed to the foundation adjacent the location where the thrust bearing is keyed to the foundation, where differential expansion between stationary and rotating components is the least. This arrangement minimizes efficiency loss due to steam leakage flow.

MODIFICATION

A modified form of the invention is utilized in a combined cycle illustrated schematically in FIGS. 7 and 8. In the modification, the low pressure steam turbine sections are of the double-flow configuration and the high pressure and intermediate turbine sections are combined in a single opposed-flow casing. In order to appreciate the difference between the invention and a conventional reheat steam turbine, it is necessary to briefly discuss a prior art arrangement shown in FIG. 6.

FIG. 6 illustrates a conventional two-casing reheat steam turbine with a double flow low pressure section. As in the prior art single flow unit shown in FIG. 1, the casings are both keyed to the foundation at only one location at the center of the exhaust hood outlet where the exhaust hood connects to the condenser, and the thrust bearing is supported in a sliding standard to allow it to move along with the casings. The steam turbine includes a first casing 51 which combines a high pressure section 52 and an intermediate pressure section 53, and a second casing 55 containing double flow low pressure turbine sections 59 supported within an exhaust hood discharging to the condenser. The turbine rotors are rigidly coupled to the rotor of a generator 63, and the single shaft system and turbine casings are supported on bearing standards 79, 80 and 81. The low pressure casing 55 and exhaust hood are keyed to the foundation at 89. The combined high pressure and intermediate pressure casing is supported on arms keyed at 89 and 90 to bearing standards 79, 80, respectively. The single shaft system is restrained axially by a thrust bearing 91 located in bearing standard 79. Bearing standard 80 may move axially by sliding on the foundation as indicated by arrows 63. The bearing standard 79 with the thrust bearing is supported on flexible legs 43 and may also move axially as indicated by arrows 47. An expansion bellows 97 in the crossover between casings 51 and 55 allows for differential thermal expansion between them.

In operation, the casings may grow thermally from foundation key 89 causing standards 79, 80, 81 to move axially. The shaft system is located by the thrust bearing 91 in standard 79 adjacent the high pressure section 52, where steam density is the greatest and where differential expansion is the least, thus minimizing efficiency loss due to steam leakage flow.

Referring now to the modification shown in FIG. 7 for a combined cycle, a gas turbine shown generally at 126, reheat steam turbine 128 and generator 130 are disposed on a single shaft system 132 as before comprising rigidly coupled rotor members and having a single thrust bearing 134 disposed in the gas turbine compressor bearing standard. The elements of the gas turbine 126 and generator 130 are as previously described. However, the steam turbine 128 comprises a high pressure turbine section 136 with an intermediate pressure turbine section 138 receiving reheated steam from the reheater, but arranged in a common or first casing 139 with the high pressure turbine section 136. The intermediate pressure turbine 138 exhausts steam through a crossover conduit 140 to a double-flow low pressure casing 142. The crossover conduit 140 is arranged in a known manner with expansion bellows 141 to permit relative movement between the two casings 139 and 142.

Referring to FIG. 8, the details of reheat double-flow steam turbine 128 are shown. A foundation which includes portions shown at 144, 146, 148 supports the steam turbine 128. A bearing standard 150 is supported by foundation portion 144 and keyed thereto to restrain its movement at 152. A bearing standard 154 on flexible legs 156 is supported on foundation portion 146 and may move axially as shown by arrows 158. The first casing 139 containing the high pressure turbine section 136 and intermediate pressure turbine section 138 is supported at the high pressure end on a pair of arms 160 keyed to the bearing standard at 162. The intermediate pressure end is supported on a pair of arms 164 keyed to the axially movable bearing standard 154 at 166.

The second casing comprising opposed flow low pressure turbine sections 168, 170 are arranged in an exhaust hood 172 supported on bearing standards 174, 176. The hood is keyed to the foundation at 178, and the ends are free to expand in both axial directions on bearing standards 174, 176, which slide on foundation portions 146, 148.

FIG. 9 is a partial schematic view between casings 139 and 142, showing an alternate arrangement, which permits independent axial movement of both casings. A common bearing standard 180 is slidable on foundation portion 182 as indicated by arrows 184 to allow the casing 142 to move. Casing 139 is supported at one end on a pair of arms 186 which may slide as indicated by arrows 188. Thus, as the steam turbine casings heat up, casing 142 may move to the left on the foundation, from its keying location 178, while casing 139 may move to the right on the bearing standard from its keying location 152 adjacent the thrust bearing 134 (see FIG. 8).

As in the preferred arrangement, discussed previously in connection with FIGS. 1-5, the double-flow modification discussed in FIGS. 6-9 locates the high pressure turbine section in the first casing on the side of the steam turbine toward the gas turbine where the thrust bearing is keyed to the foundation, so that differential thermal expansion between the high pressure turbine casing and its rotor is minimized. Also, as before, the intermediate pressure turbine casing is supported on a bearing standard which allows it to move axially with respect to the foundation. Also, as before, the exhaust hood is keyed to the foundation near the center of its opening to the condenser and and expands thermally away from the central points where it is keyed to the foundation. The single shaft system expands through the entire steam turbine stationary portion. However, the units are arranged such that relative thermal expansion is minimized at the high pressure end and permitted on the low pressure end where it is less critical in its effect on efficiency.

In summary, the improved two-casing reheat steam turbine of the present invention employs a novel combination of casing arrangement and keyed points to permit it to be solidly coupled to a gas turbine and generator on a shaft having a single thrust bearing and having the generator on one end of the equipment train. The mechanical requirements for all rotating and stationary components to expand and contract freely, for maintaining a stationary point of connection of the exhaust hood to the condensor and for the balancing of thrust load through use of opposed sections are met. The novel combination of casing arrangement and anchor points permits the large differential expansion while achieving close axial spacing of the stationary nozzles and rotating buckets in the hot operating condition in the high pressure and intermediate pressure turbine sections. Therefore, with the present invention, a single shaft combined cycle machine can be built which has essentially the same level of efficiency as a more complex and expensive plant having gas turbine and steam turbine generators on separate shaft systems.

I claim:

1. In a combined cycle plant having a gas turbine, a steam turbine, and a generator all being disposed on a foundation and arranged in tandem in the order aforementioned on a single shaft system having a single thrust bearing and a plurality of rigidly coupled rotor members, the improvement comprising:

said thrust bearing being supported on first means keyed to said foundation on the side of said steam turbine toward said gas turbine to restrain axial movement of said single shaft system, said steam turbine comprising a reheat steam turbine having a first casing supported at one end thereof on second means keyed to said foundation adjacent said thrust bearing to be restrained against axial movement, said reheat turbine having an exhaust hood and having a second casing supported at least in part within said exhaust hood, said second casing being supported on third means keyed to said foundation near the center of the exhaust hood outlet, whereby said first and second casings grow thermally independently of one another and independently of said single shaft system.

2. The improvement accordingly to claim 1, and further including a high pressure turbine section disposed in said first casing, an intermediate pressure section connected to receive steam reheated by the exhaust from said gas turbine, and a low pressure turbine section disposed in said second casing connected to receive steam from said intermediate pressure section and discharging into said exhaust hood.

3. The improvement according to claim 2, further including a bearing standard disposed on the end of said second casing toward said generator, said second casing being mounted on said bearing standard to allow axial movement with respect to said third means, said intermediate pressure turbine section being disposed in said second casing, and said low pressure turbine section being a single flow turbine.

4. The improvement according to claim 3, wherein said high pressure turbine section employs interlocking high-low packings to provide for greater thermal efficiency and wherein said intermediate pressure turbine section employs non-interlocking packings permitting substantial relative movement between rotating and non-rotating members in order to accommodate substantial differential thermal expansion.

5. The improvement according to claim 2, wherein said first casing has an inlet end and is disposed with said inlet end located nearest said thrust bearing, wherein said intermediate pressure and low pressure turbine sections are disposed in said second casing combined with an exhaust hood, said second casing having an inlet end disposed on the side of the steam turbine toward said generator, whereby said second casing grows toward the inlet end thereof independently of said first casing.

6. The improvement according to claim 2, wherein said high pressure turbine section and intermediate pressure turbine section are combined in said first casing, and wherein said low pressure turbine section comprises a double-flow turbine in said second casing, said exhaust hood being keyed to said foundation at its center to restrain axial movement, whereby said second casing grows thermally independently of said first casing.

7. The improvement according to claim 1, wherein the first casing is supported at its other end on a first bearing standard adapted to permit axial movement of said other end with respect to the foundation.

8. The improvement according to claim 1, wherein said second casing is partially supported at one end thereof on a second bearing standard adapted to permit axial movement with respect to the foundation.

9. The improvement according to claim 1, wherein said first and second casings are each partially supported on a common bearing standard disposed between them, said common bearing standard being arranged to move axially with respect to the foundation and one of said casings being adapted to move axially with respect to said common bearing standard.

* * * * *